United States Patent
Miao et al.

(10) Patent No.: US 8,879,815 B2
(45) Date of Patent: Nov. 4, 2014

(54) AUTOMATIC INITIALIZATION FOR 2D/3D REGISTRATION

(75) Inventors: Shun Miao, Plainsboro, NJ (US); Christophe Chefd'hotel, Jersey City, NJ (US); Rui Liao, Princeton Junction, NJ (US)

(73) Assignee: Siemens Aktiengesellschaft, Munich (DE)

(*) Notice: Subject to any disclaimer, the term of this patent is extended or adjusted under 35 U.S.C. 154(b) by 155 days.

(21) Appl. No.: 13/591,752

(22) Filed: Aug. 22, 2012

(65) Prior Publication Data

US 2013/0051647 A1 Feb. 28, 2013

Related U.S. Application Data

(60) Provisional application No. 61/526,442, filed on Aug. 23, 2011.

(51) Int. Cl.
*G06K 9/00* (2006.01)
*G06T 7/00* (2006.01)
*A61B 8/00* (2006.01)

(52) U.S. Cl.
CPC ..... *G06T 7/0032* (2013.01); *G06T 2207/10081* (2013.01); *G06T 2207/10121* (2013.01)
USPC .......................................... 382/131; 600/443

(58) Field of Classification Search
CPC .................................. G06K 1/00; G06T 1/00
USPC ........... 382/128, 129, 130, 131, 132, 13, 134, 382/154; 378/4, 8, 21–27, 101, 901; 600/407, 410, 411, 425, 427; 128/920, 128/922
See application file for complete search history.

(56) References Cited

U.S. PATENT DOCUMENTS

| 5,926,568 A | * 7/1999 | Chaney et al. ................. 382/217 |
| 2010/0111370 A1 | * 5/2010 | Black et al. .................... 382/111 |

* cited by examiner

*Primary Examiner* — Abolfazl Tabatabai (57) ABSTRACT

A method for automatic initialization of 2D to 3D image registration includes acquiring a 3D model. A plurality of shape descriptor features is calculated from the acquired 3D model representing a plurality of poses of the 3D model. A 2D image is acquired. The plurality of shape descriptors is matched to the acquired 2D model. An optimum pose of the 3D model is determined based on the matching of the plurality of shape descriptors to the acquired 2D model. An initial registration is generated, in an image processing system, between the 3D model and the 2D image based on the determined optimum pose.

19 Claims, 6 Drawing Sheets

AUTOMATIC INITIALIZATION FOR 2D/3D REGISTRATION

CROSS-REFERENCE TO RELATED APPLICATIONS

The present application is based on provisional application Ser. No. 61/526,442, filed Aug. 23, 2011, the entire contents of which are herein incorporated by reference.

BACKGROUND

1. Technical Field

The present disclosure relates to image registration and, more specifically, to automatic initialization for 2D/3D registration.

2. Discussion of Related Art

2D/3D image registration is the practice of aligning two-dimensional (2D) images and three-dimensional (3D) images to a common spatial reference. 2D/3D image registration may be used to overlay 2D image data, which may often be acquired relatively quickly, with previously acquired or otherwise known 3D image data, which may contain enhanced image detail. One common application for 2D/3D image registration is to combine 3D image data acquired from a computed tomography (CT) scan with 2D image data acquired in real-time from a fluoroscope. Upon registering the CT image data with the fluoroscope image data, the structural detail of the CT image may be superimposed on the real-time fluoroscope image so that highly detailed real-time image guidance may be provided for a practitioner performing image-guided therapy and/or interventional radiology.

One common approach to performing image registration is to perform digitally reconstructed radiograph (DRR) registration. In this approach, a large number of 2D X-ray images are simulated from the 3D image data and 3D image pose of the simulated X-ray images are then adjusted to make the DRR image look as similar to the X-ray image as possible.

A clinical constraint of DRR-based registration techniques is that they have a relatively small capture range, which may mean that an initial pose and the optimal pose may have to be fairly close together in order to avoid optimizing to a local maximum rather than a global maximum. Accordingly, establishing the initial pose may typically require manual initialization of the volume position to bring the parameters to be estimated into the capture range. This establishment of the initial pose may be referred to as manual initialization.

During manual initialization, a human user may be asked to provide the initial pose of the 3D data so that the simulated X-ray image, the DRR, may align with the real X-ray image. However, manual initialization may introduce human error, may reduce reliability and repeatability of results, and may add time and expense to the registration process.

BRIEF SUMMARY

A method for automatic initialization of 2D to 3D image registration includes acquiring a 3D model. A plurality of shape descriptor features is calculated from the acquired 3D model representing a plurality of poses of the 3D model. A 2D image is acquired. The plurality of shape descriptors is matched to the acquired 2D model. An optimum pose of the 3D model is determined based on the matching of the plurality of shape descriptors to the acquired 2D model. An initial registration is generated, in an image processing system, between the 3D model and the 2D image based on the determined optimum pose.

The 3D model may be a computer aided design (CAD) model. The 3D model may be acquired from a medical imaging study. The plurality of shape descriptor features may include a set of statistical characterizations of the 3D model at respective poses of the plurality of poses. The set of statistical characterizations may include a measure of distances between an outer contour of a silhouette of a 2D rendering of the 3D model at the corresponding pose and a point of reference. The point of reference may be a center of mass of the silhouette and/or a point on the contour and the measure of distance is an arc length along the contour.

Determining the optimum pose of the 3D model based on the matching of the plurality of shape descriptors to the acquired 2D model may include determining which shape descriptor of the plurality of shape descriptors is a best match to the acquired 2D image and determining the pose of the plurality of posses associated with the best match shape descriptor.

The plurality of shape descriptor features may be calculated from the 3D model and stored in a library of shape descriptor features prior to the acquisition of the 2D image. The plurality of shape descriptor features may be retrieved from the library at about the time of the 2D image acquisition.

The 2D image may be an X-ray image. The X-ray image may be part of a fluoroscopic image sequence.

The initial registration may be used to perform automatic registration between the 3D model and the 2D image. The 2D image may be a frame within a sequence of 2D images and the automatic registration may be used to combine the 3D model with the sequence of 2D images. The combined sequence may be displayed in real-time.

The acquired 2D image may be preprocessed to determine a set of features analogous to the shape descriptor features prior to the matching.

A system for providing intervention guidance includes a feature generating device for receiving a 3D model and calculating a plurality of shape descriptor features from the acquired 3D model representing a plurality of poses of the 3D model. A database stores the plurality of shape descriptor features. A feature matching device retrieves the plurality of shape descriptor features from the database, matches the plurality of shape descriptors to an acquired 2D model, and determines an optimum pose of the 3D model based on the matching of the plurality of shape descriptors to the acquired 2D model. An image processing device generates an initial registration, in an image processing system, between the 3D model and the 2D image based on the determined optimum pose. Automatic registration is performed between the 3D model and the 2D image based on the initial registration. The 3D model is combined with a sequence of 2D image frames that includes the 2D image. A display device displays the combined image sequence in real-time.

The 3D model may be a computer aided design (CAD) model or a medical imaging study. The plurality of shape descriptor features may include a set of statistical characterizations of the 3D model at respective poses of the plurality of poses, and the set of statistical characterizations includes a measure of distances between an outer contour of a silhouette of a 2D rendering of the 3D model at the corresponding pose and a point of reference. The 2D image may be an X-ray image that is part of a fluoroscopic image sequence.

A computer system includes a processor and a non-transitory, tangible, program storage medium, readable by the computer system, embodying a program of instructions executable by the processor to perform method steps for automatic initialization of 2D to 3D image registration. The method includes matching a plurality of shape descriptor features from an acquired 3D model representing a plurality of poses of the 3D model to an acquired 2D model. An optimum pose of the 3D model is determined based on the matching of the plurality of shape descriptors to the acquired 2D model. An initial registration is generated, in an image processing system, between the 3D model and the 2D image based on the determined optimum pose.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing exemplary embodiments of the present disclosure illustrated in the drawings, specific terminology is employed for sake of clarity. However, the present disclosure is not intended to be Limited to the specific terminology so selected, and it is to be understood that each specific element includes all technical equivalents which operate in a similar manner.

Exemplary embodiments of the present invention may provide systems and methods for automatic initialization in 2D/3D registration. By performing automatic initialization, the process of 2D/3D registration may be made more reliable, more consistent, faster, and/or less expensive.

While the techniques discussed herein may be applied to any 2D/3D registration problem, for the purposes of providing a simple explanation, the 3D image described includes a 3D computer aided design (CAD) model of an implant device. It should be understood that the techniques for automatic initialization may be applied regardless of the origin of the 3D image data and the 3D image data may be from any source, for example, from a CT scan.

Because it may be assumed that the 3D model may be known before hand, exemplary embodiments of the present invention seek to construct a library of features from the 3D model. These features may represent various combinations of registration parameters that may be used as transformation parameters to accurately align the two images. These features are pre-computed, for example, before the acquisition of the 2D image(s) begins. The initialization may then be estimated by matching the pre-computed features to the 2D image(s) upon their acquisition.

Figure 1:
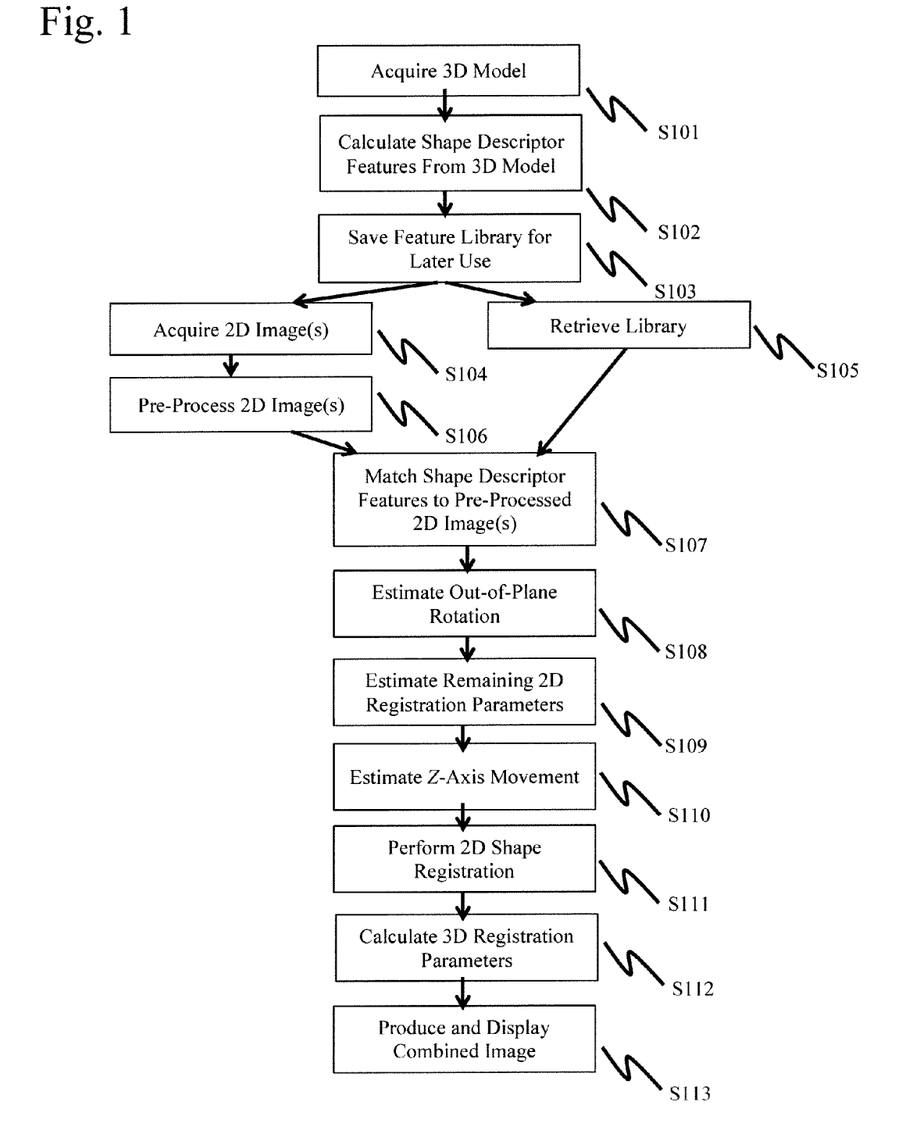
FIG. 1 is a flow chart illustrating a method for 2D/3D image registration in accordance with exemplary embodiments of the present invention.

FIG. 1 is a flow chart illustrating a method for 2D/3D image registration in accordance with exemplary embodiments of the present invention. First the 3D image model is acquired (Step S101). As discussed above, the 3D image model may be described herein as a CAD model for an implant; however, the 3D image model may alternatively be any form of 3D image data and may be, for example, a CT image. A plurality of shape descriptor features may be calculated from the 3D image model (Step S102). Each shape descriptor feature may be a statistical description of the shape of the 3D image model. Each shape descriptor feature may be calculated from a 2D slice of the 3D image model or from a 2D projection of the 3D image model. The shape descriptor feature may be invariant to rotation, translation, and scale in the projection plane. Various exemplary approaches for calculating shape descriptor features are described in detail below.

After the plurality of shape descriptor features have been calculated, the features may be saved as a library of shape descriptor features for later use (Step S103). The 3D image model itself need not be saved alongside the library of shape descriptor features. Accordingly, the resources required for saving and processing the 3D image for registration may be reduced. Moreover, as the shape descriptor features are saved for later use, the time and processing resources required to compute the shape descriptors may be provided as it is convenient to do so. For example, where a CT scan is acquired at a first scheduled appointment and an interventional procedure is to be conducted during a second scheduled appointment, the computation of the shape descriptor features may be performed at any convenient point between the two scheduled appointments, as dictated by the availability of computational resources. This off-line approach to calculating the shape descriptor features may lessen the computational resources required during the 2D/3D registration, which may be performed in real-time during an intervention.

The 2D image(s) may later be acquired (Step S104) and at substantially the same time, the saved library of shape descriptor features may be retrieve (Step S105). The 2D image(s) may include a sequence of real-time images such as a fluoroscopic image sequence. For these purposes, it does not matter whether the library is retrieved prior to, concurrently, or at the same time as the 2D image(s) are acquired, however, according to one exemplary embodiment of the present invention, the library is retrieved just prior to the acquisition of the 2D image(s).

Then, the 2D image may be pre-processed to facilitate library matching (Step S106). Pre-processing may include performing various transformations to the 2D image and/or applying various filters. One or more of the steps involved in pre-processing the 2D image may be similar to steps performed in computing the shape descriptor features for the 3D model. For example, pre-processing the 2D image may include segmenting the 2D image and calculating one or more feature histograms for the segmented 2D image. A more detailed description of 2D image pre-processing is provided below.

The shape descriptor features of the library may then be matched to the pre-processed 2D image (Step S107). The features may be matched to the pre-processed 2D image, for example, using Jenson-Shannon Divergence (JSD) using the equation:

Matched Shape=arc max+i*JSD*($P_1|Q_1i$)  (1)

where P is the feature histogram of the 2D image and Q, represents the library of shape descriptor features including I features.

As is described in greater detail below, the shape descriptor features computed from the 3D model represent various out-of-plane rotation parameters. The out-of-plane rotation parameters may include a measure of rotational angle from which the 3D model is oriented when forming the projection from which the shape descriptor feature is calculated. These out-of-plane rotation parameters are recorded along with the shape descriptor features such that matching the shape descriptor features to the 2D image may be used to provide an estimation as to the out-of-plane rotation of the 2D image (Step S108).

After the out-of-plane rotation is estimated by the library matching, remaining registration parameters may be estimated by 2D shape registration (Step S109). The remaining registration parameters may tend not change the geometry of the 2D image. The registration parameters of the matched library entity may be denoted a $\{x_0,y_0,z_0,\theta_0,\phi_0,\varphi_0\}$, where $\phi_0$, $\varphi_0$ are out-of-plane rotation parameters that have already been estimated.

According to camera geometry, movement along the camera axis z may have scaling effects on the 2D projection. Therefore, the movement along the z axis may be estimated (Step S110). This movement z may be estimated, for example, as:

$$Z = \frac{Z_0 R_{fluoro}}{R_{library}} \quad (2)$$

where $R_{fluoro}$ and $R_{library}$ denote the largest distance from the shape contour to the center of mass on the 2D fluoroscopic image and the matched library entry, respectively.

After the movement along the z axis has been estimated, the remaining registration parameters to be estimated may be limited to 2D translation and rotation, which may be solved, in accordance with exemplary embodiments of the present invention, by 2D shape registration (Step S111). For example, given two 2D contours, the profile of the contour-to-center distance for each contour may be depicted. This depiction may be formulated, for example, as a function of the arc length. Where the starting points of the arc length parameterization in two contours are correspondent, the profiles of contour-to-center distance for each contour may be similar.

This curve parameterization may be used to give every point on a curve an index, which may be a distance along the curve (the arc length) from a given origin point (starting point) on the curve. Accordingly, circular convolution may be applied on the profiles of contour-to-center distance to obtain point-to-point correspondence between the two contours. Using this point-to-point correspondence, the 2D transformation $\{x_{2d},y_{2d},\Theta_{2d}\}$ may be estimated, for example, by directly estimating the 2D transformation using singular value decomposition (SVD).

The 3D registration parameters, which may describe rigid body transformation in 3D space may then be calculated (Step S112). There may be six 3D registration parameters, three for translation and three for rotation. Similarly, 2D registration parameters describe transformation in 2D plane. There may be three 2D registration parameters, two for translation and one for rotation. The 3D registration parameters may be calculated, for example, in accordance with the following equation:

$$x = x_{2d} \cdot \frac{SOD}{SID} \cdot y = y_{2d} \cdot \frac{SOD}{SID}, \theta = \theta_{2d} \quad (3)$$

where SOD denotes source-to-object distance and SID denotes source-to-intensifier distance.

After all 3D registration parameters have been calculated, the 2D and 3D images may be superimposed upon a common frame of reference and the combined image may be displayed (Step S113). The registration of one 2D image frame may thereafter be used as a basis of registering a next 2D image frame to the same 3D model and accordingly, a cine sequence of matched images may be displayed in real-time, for example, to serve as a visual aid in performing interventional procedures.

Figure 2:
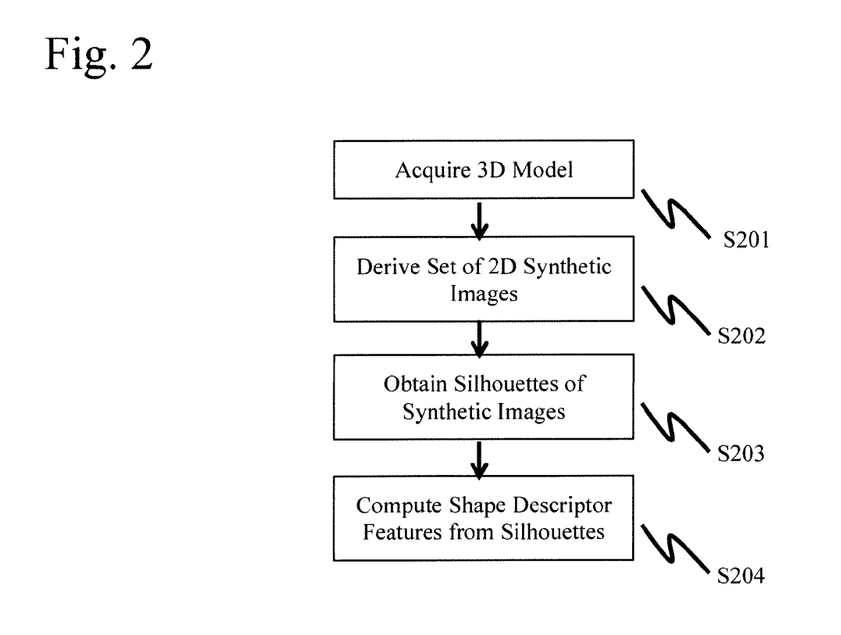
FIG. 2 is a flow chart illustrating an approach for generating a library of shape descriptor features from a 3D model in accordance with exemplary embodiments of the present invention.

As discussed above, exemplary embodiments of the present invention generate a library of features from the 3D model at a point in time prior o the acquisition of the 2D image(s). FIG. 2 is a flow chart illustrating an approach for generating a library of shape descriptor features from a 3D model in accordance with exemplary embodiments of the present invention. The library of features may include a plurality of shape descriptor features, each of which may include a statistical description of the appearance of the 3D model within a 2D plane that may be taken as a 2D projection of the 3D image from a given angle, that may be referred to herein as the "out-of-plane parameter." While the description herein discusses this approach for generating the shape descriptor features, alternative approaches may be used, for example, the shape descriptor features may be taken from a 2D image slice of the 3D image rather than as a projection. However, in either respect, the shape descriptor features may be derived from the 3D image at various angles.

Accordingly, first a 3D model may be acquired (Step S201). The 3D model may be a CAD model, a medical image scan such as a CT scan, or a 3D image acquired by other means. Next, a set of synthetic 2D images may be derived from the 3D image (Step S202). The set of synthetic 2D images may be generated from multiple different out-of-plane parameters. Registration parameters may be decomposed to three translation parameters and three rotation parameters, however, as the translation parameters and one of the rotation parameters may have relatively little impact on 2D silhouette geometry, exemplary embodiments of the present invention may focus on deriving the set of synthetic 2D images from the 3D model by sampling only changes in two of the rotational parameters.

Figure 3:
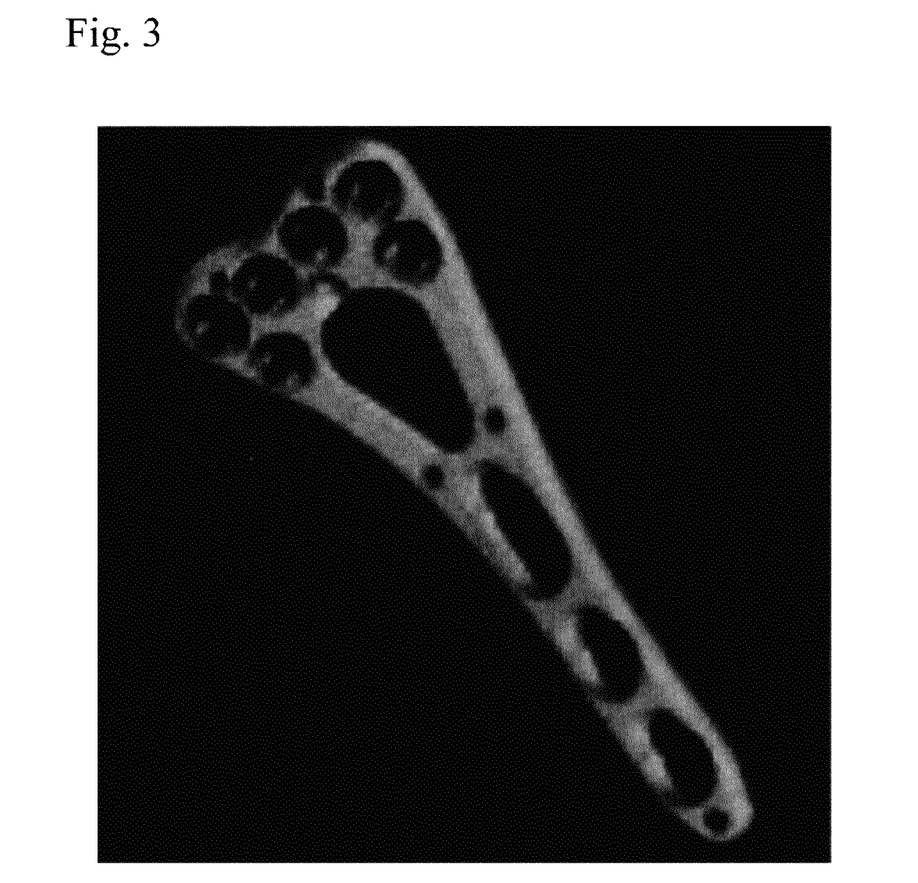
FIG. 3 is an illustration of a 3D model of an implant that may be used in accordance with exemplary embodiments of the present invention.
Figure 4:
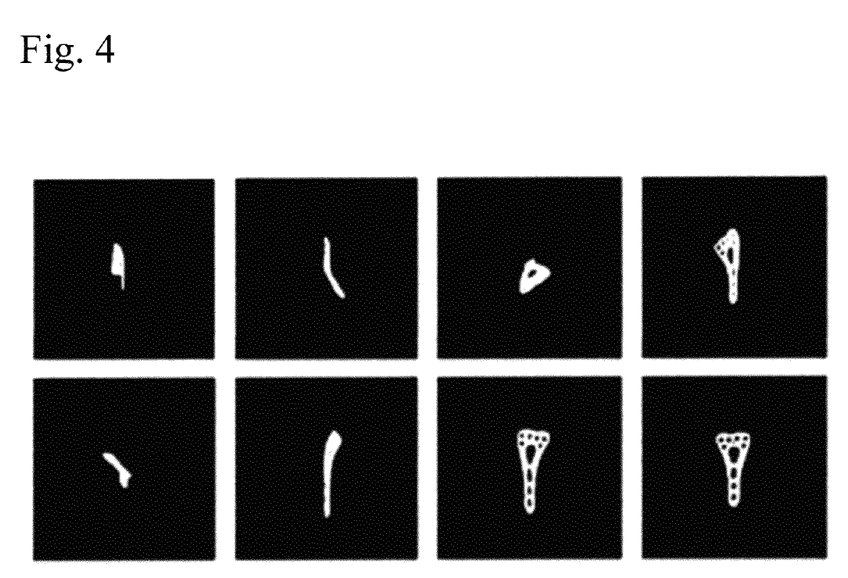
FIG. 4 is an illustration of a set of samples of the 3D model taken at various different out-of-plane rotational parameters in accordance with exemplary embodiments of the present invention.

The set of synthetic 2D images may, according to one exemplary embodiment of the present invention, be sampled at 10° intervals in both angles, thereby generating a set of 1296 2D images. FIG. 3 is an illustration of a 3D model of an implant and FIG. 4 is a set of samples of the 3D model taken at various different out-of-plane rotational parameters, i.e., the synthetic 2D images. As can be seen from these images, the rotational parameters may have a profound impact on image appearance.

Figure 5:
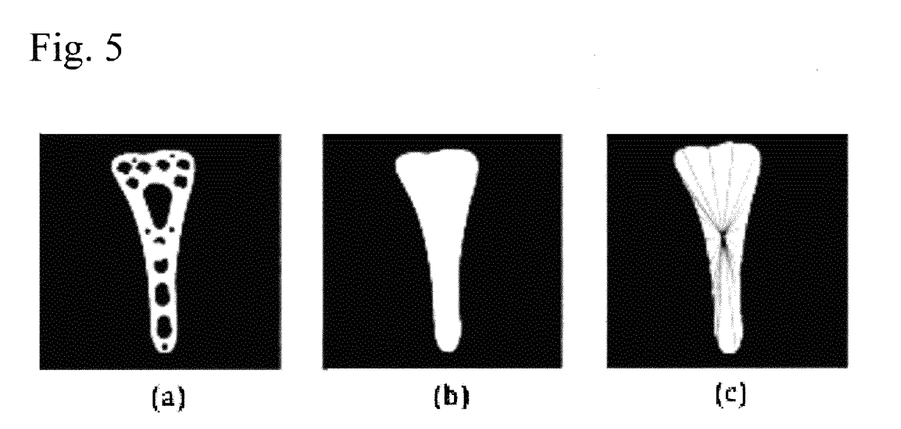
FIG. 5(a) is an exemplary synthetic 2D image sampled from the 3D model of FIG. 3 in accordance with exemplary embodiments of the present invention.
FIG. 5(b) is an illustration of a silhouette image obtained from the synthetic 2D image after hole filling in accordance with exemplary embodiments of the present invention.
FIG. 5(c) is an illustration of the silhouette image, center of mass, and various distances between the perimeter and the center of mass in accordance with exemplary embodiments of the present invention.

Each of the synthetic 2D images samples from the 3D model may be preprocessed to obtain a silhouette image (Step S203). The silhouette may be obtained by first filling any holes that may appear within the image and then extracting an outline contour from the hole-filed shape. FIG. 5(a) is an exemplary synthetic 2D image sampled from the 3D model of FIG. 3. FIG. 5(b) illustrates an example of a silhouette image obtained from the synthetic 2D image after hole filling.

From the silhouette images, various shape descriptor features may be computed (Step S204). This may include, for example, calculating a center of mass of the silhouette and calculating a set of shortest distances from various points along the perimeter of the silhouette to the calculated center of mass. FIG. 5(c) illustrates an example of the silhouette image, center of mass, and various distances between the perimeter and the center of mass.

In this example, the center of mass serves as a point of reference from which the silhouette perimeter may be measured against, however, selection of the point of reference used is not limited to the center of mass. In fact, any reference point may be used. For example, the reference point may be an average coordinate of all points along the silhouette perimeter or even a point along the silhouette perimeter itself such as a highest or lowest point. Alternatively, the reference point may be selected by fitting a box to the silhouette and then using the center of the box as the reference point. However, in calculating features in terms of distances from the silhouette perimeter to the selected reference point, any arbitrary reference point may be used as long as a consistent reference point is used for matching the acquired 2D images. Moreover, the shape descriptor features need not be limited to distances between points along the silhouette perimeter to the selected reference point, in fact, any quantitative approach to describing the synthetic 2D images may be used. The distance-to-reference approach described herein is used as it is an example of an approach to quantifying the shapes in a way that is invariant to rotation and translation. In fact, the distances so calculated may also be normalized so that the features are invariant to scale. This normalization may be performed at any step, for example, the scale of the silhouettes may be normalized and/or z axis camera distance may be controlled using the approach discussed above to provide scale invariance.

Regardless of the procedure used to compute, off-line, the shape descriptor features from the synthetic 2D images of the 3D model, similar procedures may be used to quantify the shape of the acquired 2D images so that registration may be performed. In a sense, comparable shape descriptor features are calculated for the acquired 2D images in the on-line environment. These calculations may be part of the 2D image pre-processing of Step S106. Accordingly, in pre-processing the 2D images, exemplary embodiments of the present invention may obtain silhouettes of the 2D images, determine the center of mass, or other reference, and then calculate the set of distances from the silhouette contour to the center.

Then, at the step of matching the shape descriptor features to the pre-processed 2D images (Step S107), the set of perimeter-to-center distances calculated from the synthetic 2D images of the 3D model may be compared against the perimeter-to-center distances calculated for the acquired 2D images in order to find where they may match. Any matches so obtained may be used as the basis for initialization of the 2D/3D images without requiring manual input.

Figure 6:
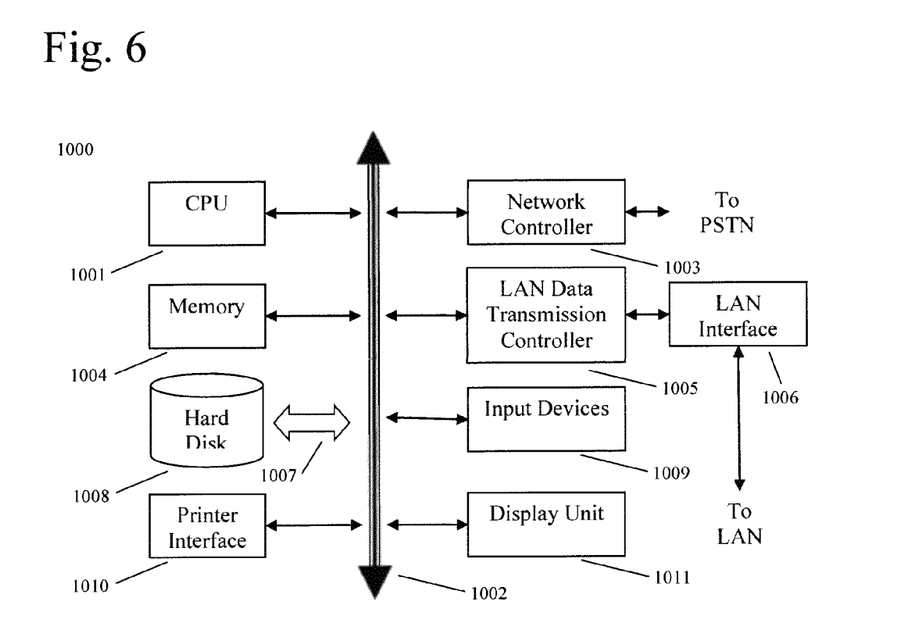
FIG. 6 shows an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for automatic initialization of 2D to 3D image registration, comprising:
   acquiring a 3D model;
   calculating a plurality of shape descriptor features from the acquired 3D model representing a plurality of poses of the 3D model;
   storing the plurality of shape descriptor features in a library of shape descriptor features
   acquiring a 2D image;
   matching the plurality of shape descriptors from the library of shape descriptor features to the acquired 2D model;
   determining an optimum pose of the 3D model based on the matching of the plurality of shape descriptors to the acquired 2D model; and
   generating an initial registration, in an image processing system, between the 3D model and the 2D image based on the determined optimum pose.

2. The method of claim 1, wherein the 3D model is a computer aided design (CAD) model.

3. The method of claim 1, wherein the 3D model is acquired from a medical imaging study.

4. The method of claim 1 wherein the plurality of shape descriptor features include a set of statistical characterizations of the 3D model at respective poses of the plurality of poses.

5. A method of claim 1, wherein the plurality of shape descriptor features are calculated from the 3D model and stored in a library of shape descriptor features prior to the acquisition of the 2D image and the plurality of shape descriptor features are retrieved from the library at about the time of the 2D image acquisition.

6. The method of claim 1, wherein the 2D image is an X-ray image.

7. The method of claim 6, wherein the X-ray image is part of a fluoroscopic image sequence.

8. The method of claim 1, wherein the initial registration is used to perform automatic registration between the 3D model and the 2D image.

9. The method of claim 8, wherein the 2D image is a frame within a sequence of 2D images and the automatic registration is used to combine the 3D model with the sequence of 2D images.

10. The method of claim 9, wherein the combined sequence is displayed in real-time.

11. The method of claim 1, wherein the acquired 2D image is preprocessed prior to the matching to determine a set of features analogous to the shape descriptor features.

12. A method for automatic initialization of 2D to 3D image registration, comprising:
acquiring a 3D model;
calculating a plurality of shape descriptor features from the acquired 3D model representing a plurality of poses of the 3D model;
acquiring a 2D image;
matching the plurality of shape descriptors to the acquired 2D model;
determining an optimum pose of the 3D model based on the matching of the plurality of shape descriptors to the acquired 2D model; and
generating an initial registration, in an image processing system, between the 3D model and the 2D image based on the determined optimum pose,
wherein the plurality of shape descriptor features include a set of statistical characterizations of the 3D model at respective poses of the plurality of poses;
wherein the set of statistical characterizations includes a measure of distances between an outer contour of a silhouette of a 2D rendering of the 3D model at the corresponding pose and a point of reference.

13. The method of claim 12 wherein the point of reference is a center of mass of the silhouette.

14. The method of claim 12 wherein the point of reference is a point on the contour and the measure of distance is an arc length along the contour.

15. A method for automatic initialization of 2D to 3D image registration, comprising:
acquiring a 3D model;
calculating a plurality of shape descriptor features from the acquired 3D model representing a plurality of poses of the 3D model;
acquiring a 2D image;
matching the plurality of shape descriptors to the acquired 2D model;
determining an optimum pose of the 3D model based on the matching of the plurality of shape descriptors to the acquired 2D model; and
generating an initial registration, in an image processing system, between the 3D model and the 2D image based on the determined optimum pose,
wherein determining the optimum pose of the 3D model based on the matching of the plurality of shape descriptors to the acquired 2D model includes determining which shape descriptor of the plurality of shape descriptors is a best match to the acquired 2D image and determining the pose of the plurality of posses associated with the best match shape descriptor.

16. A system for providing intervention guidance, comprising:
a feature generating device for receiving a 3D model and calculating a plurality of shape descriptor features from the acquired 3D model representing a plurality of poses of the 3D model;
a library of shape descriptor features for storing the plurality of shape descriptor features;
a feature matching device for retrieving the plurality of shape descriptor features from the library of shape descriptor features, matching the plurality of shape descriptors from the library of shape descriptor features to an acquired 2D model, and determining an optimum pose of the 3D model based on the matching of the plurality of shape descriptor to the acquired 2D model;
an image processing device for generating an initial registration, in an image processing system, between the 3D model and the 2D image based on the determined optimum pose, performing automatic registration between the 3D model and the 2D image based on the initial registration, and combining the 3D model with a sequence of 2D image frames that includes the 2D image; and
a display device for displaying the combined image sequence in real-time.

17. The system of claim 16, wherein the 3D model is a computer aided design (CAD) model or a medical imaging study.

18. The system of claim 16, wherein the 2D image is an X-ray image that is part of a fluoroscopic image sequence.

19. A system for providing intervention guidance, comprising:
a feature generating device for receiving a 3D model and calculating a plurality of shape descriptor features from the acquired 3D model representing a plurality of poses of the 3D model;
a database for storing the plurality of shape descriptor features;
a feature matching device for retrieving the plurality of shape descriptor features from the database, matching the plurality of shape descriptors to an acquired 2D model, and determining an optimum pose of the 3D model based on the matching of the plurality of shape descriptors to the acquired 2D model;
an image processing device for generating an initial registration, in an image processing system, between the 3D model and the 2D image based on the determined optimum pose, performing automatic registration between the 3D model and the 2D image based on the initial registration, and combining the 3D model with a sequence of 2D image frames that includes the 2D image; and
a display device for displaying the combined image sequence in real-time,
wherein the plurality of shape descriptor features includes a set of statistical characterizations of the 3D model at respective poses of the plurality of poses, and the set of statistical characterizations includes a measure of distances between an outer contour of a silhouette of a 2D rendering of the 3D model at the corresponding pose and a point of reference.

* * * * *